United States Patent [19]

Hannebaum et al.

[11] 4,345,972
[45] Aug. 24, 1982

[54] ALCOHOL RECOVERY PROCESS

[76] Inventors: Tilda M. Hannebaum; Harold W. Hannebaum, both of P.O. Box H, Shoshone, Id. 83352

[21] Appl. No.: 164,854

[22] Filed: Jul. 1, 1980

[51] Int. Cl.³ .............................................. B01D 3/02
[52] U.S. Cl. .............................. 203/18; 203/DIG. 11; 203/DIG. 13; 203/DIG. 24
[58] Field of Search .............. 202/185 B, 83; 165/122; 203/19, 18, DIG. 11, DIG. 13, DIG. 24; 568/913, 916, 950, 958

[56] References Cited

U.S. PATENT DOCUMENTS

| | | | |
|---|---|---|---|
| 793,732 | 7/1905 | Morlan | 202/185 B |
| 1,580,234 | 4/1926 | Demuth | 165/122 |
| 1,881,770 | 10/1932 | Lyman | 165/122 |

*Primary Examiner*—Frank Sever
*Attorney, Agent, or Firm*—Howard I. Podell

[57] ABSTRACT

An improved condenser for distillation purposes which is particularly suited for use in distilling alcohol. The condenser is in the form of a cylinder, open at its ends, and formed of a double jacket wall of spaced concentric cylindrical sheets, preferably of copper or aluminum metal. The jacket interior is joined at an upper end to an inlet pipe fitting that may be coupled to tube leading from a mash cooker unit. A drain tube for the distilled alcohol-water mixture extends from the bottom end of the jacket interior. A plurality of spaced legs extend from the periphery of the lower open end of the cylinder so that in use the condenser is mounted with its central axis extending on a vertical line, and with the open cylinder and located above the surface to which the cylinder legs rest or are fixed.

1 Claim, 21 Drawing Figures

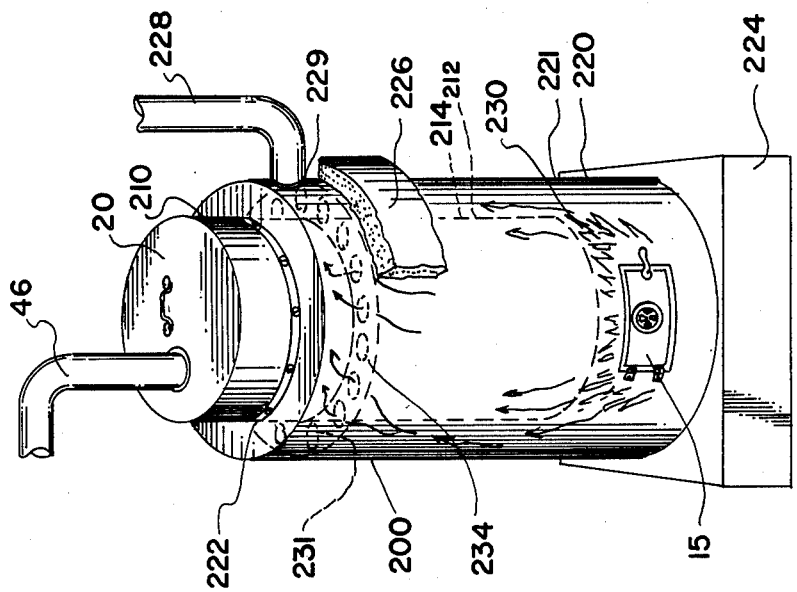
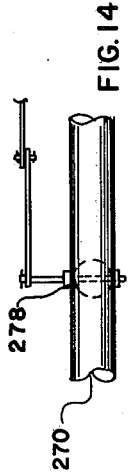
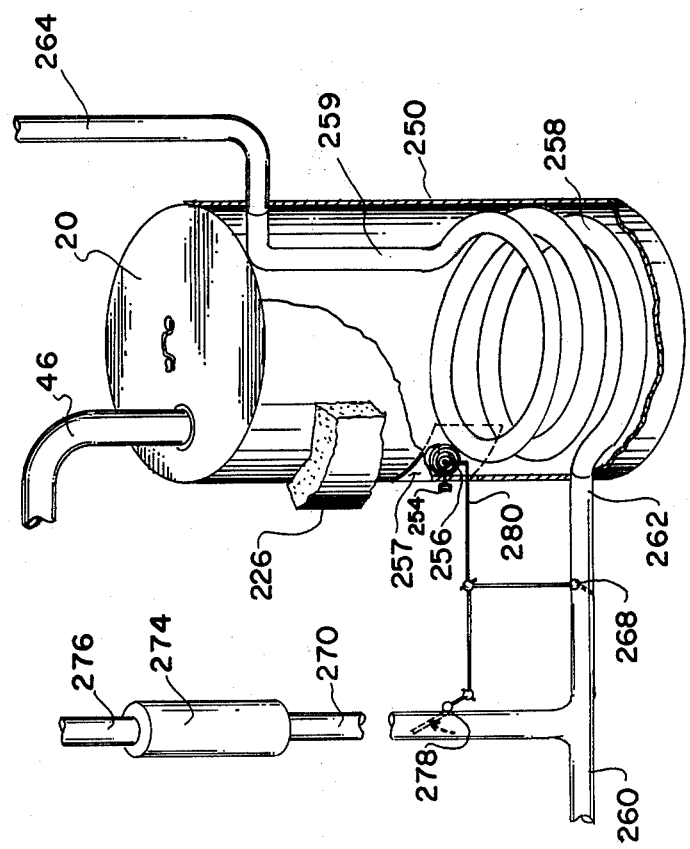
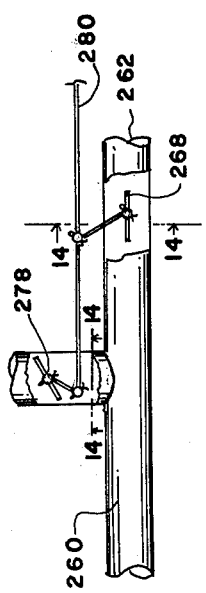
FIG. 11
FIG. 14
FIG. 12
FIG. 13

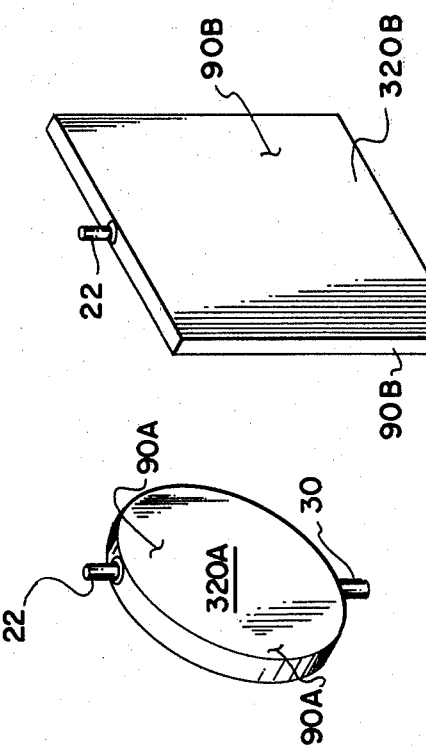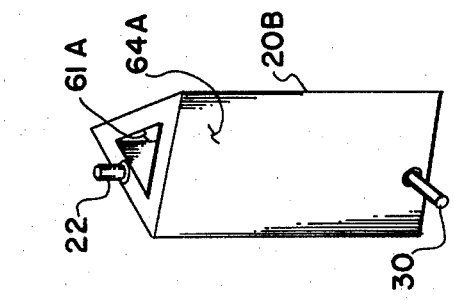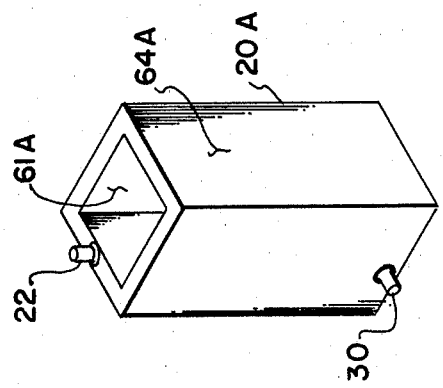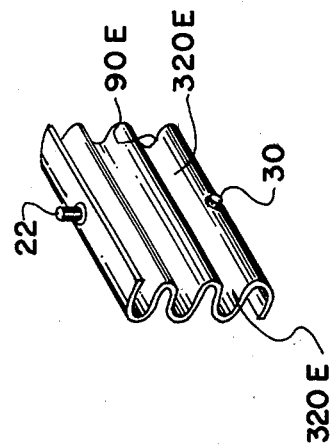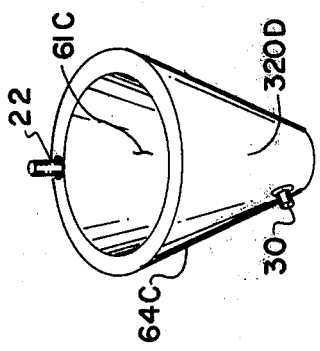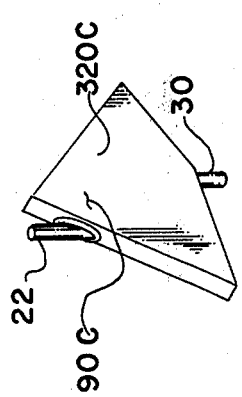

ALCOHOL RECOVERY PROCESS

BACKGROUND OF THE INVENTION

The use of a condenser for distillation purposes is well known. Typical such condensers are disclosed in U.S. Pat. Nos. 1,277,931; 833,271; 227,035; 969,733; 7,439X of Feb. 23, 1833; 92,633; and 526,613. These condensers of the prior art do not suggest the simplicity and effectiveness of the applicant's condenser, nor the condenser structure of the applicant which is cooled by ambient air and may be employed without recourse to a supply of cooling water.

SUMMARY OF THE INVENTION

Our invention is an improved condenser for distillation purposes which is particularly suited for use in distilling alcohol. The condenser is in the form of a cylinder, open at its ends, and formed of a double jacket wall of spaced concentric cylindrical sheets, preferably of copper or aluminum metal. The jacket interior is joined at an upper end to an inlet pipe fitting that may be coupled to tube leading from a mash cooker unit. A drain tube for the distilled alcohol-water mixture extends from the bottom end of the jacket interior.

A plurality of spaced legs extend from the periphery of the lower open end of the cylinder so that in use the condenser is mounted with its central axis extending on a vertical line, and with the open cylinder end located above the surface to which the cylinder legs rest or are fixed.

A natural air draft is formed in the open cylinder interior by the heat of the cylinder walls, to cause cooling air to flow upwards about the interior and exterior walls of the jacket, when alcohol vapors from a mash cooker are led into the inlet pipe fitting of the condenser, with cold ambient air drawn into the bottom open end of the cylinder interior.

The shortage of energy sources is drawing increased attention to the value of alcohol when used as a fuel or when employed as an additive to gasoline for fueling internal combustion engines. My condenser will distill the vapor of a mash cooker to produce an alcohol-water condensate, in one pass, of ninety to one-hundred proof. Since the water of the condensate is a pure distillate, the condensate of this condenser may be fed together with gasoline fuel directly into the intake of an internal combustion engine in suitable fashion to improve the performance of the engine, with the alcohol serving as fuel and the water providing improved thermodynamic performance of such an engine. Preferably such a condensate mixture would be fed into an engine employing separate carburetor intakes for the gasoline fuel and for the alcohol-water condensate.

The condenser of this invention is well suited for farm use and may be located, together with the mash cooker in an outside stationary location remote from a supply of water, since the shape of the condenser causes a natural flow of cooling air about the exterior of the condenser walls. The condenser and the mash cooker may also be mounted on the frame of a stationary of tractor engine, with the mash cooker located so as to be heated by the exhaust of the engine, and the distilled alcohol-water condensate led directly into the carburetor of the engine.

Farmers and ranchers may utilize waste vegetation, sorghum, potatoes, beets as a supply of mash to which brewer's yeast and water is added in the mash cooker. The residue from the mash cooker may be fed, after the alcohol has been distilled off, to live stock, or else dried to form a solid fuel for heating the next batch of mash.

I estimate that, at the January 1980 price level, one-hundred proof alcohol can be distilled from sorghum at a cost of $0.25 per gallon, including the cost of the crop and of the fuel for heating the mash cooker. This cost is well below the equivalent fuel cost of gasoline that the mixture can supersede.

BRIEF DESCRIPTION OF THE DRAWINGS

The objects and features of the invention may be understood with reference to the following detailed description of an illustrative embodiment of the invention, taken together with the accompanying drawings in which:

FIG. 11 is a perspective view of a further alternative embodiment of the mash cooker unit;

FIG. 12 is a detail view of a further alternative embodiment of the tractor-mounted unit;

FIG. 13 is a detail view of an alternative valve structure of the embodiment of FIG. 12;

FIG. 14 is a detail view taken along line 14—14 of FIG. 13; and

FIGS. 15–21 are perspective views of alternative embodiments of the condenser unit.

DESCRIPTION OF THE PREFERRED EMBODIMENT

Figure 1:
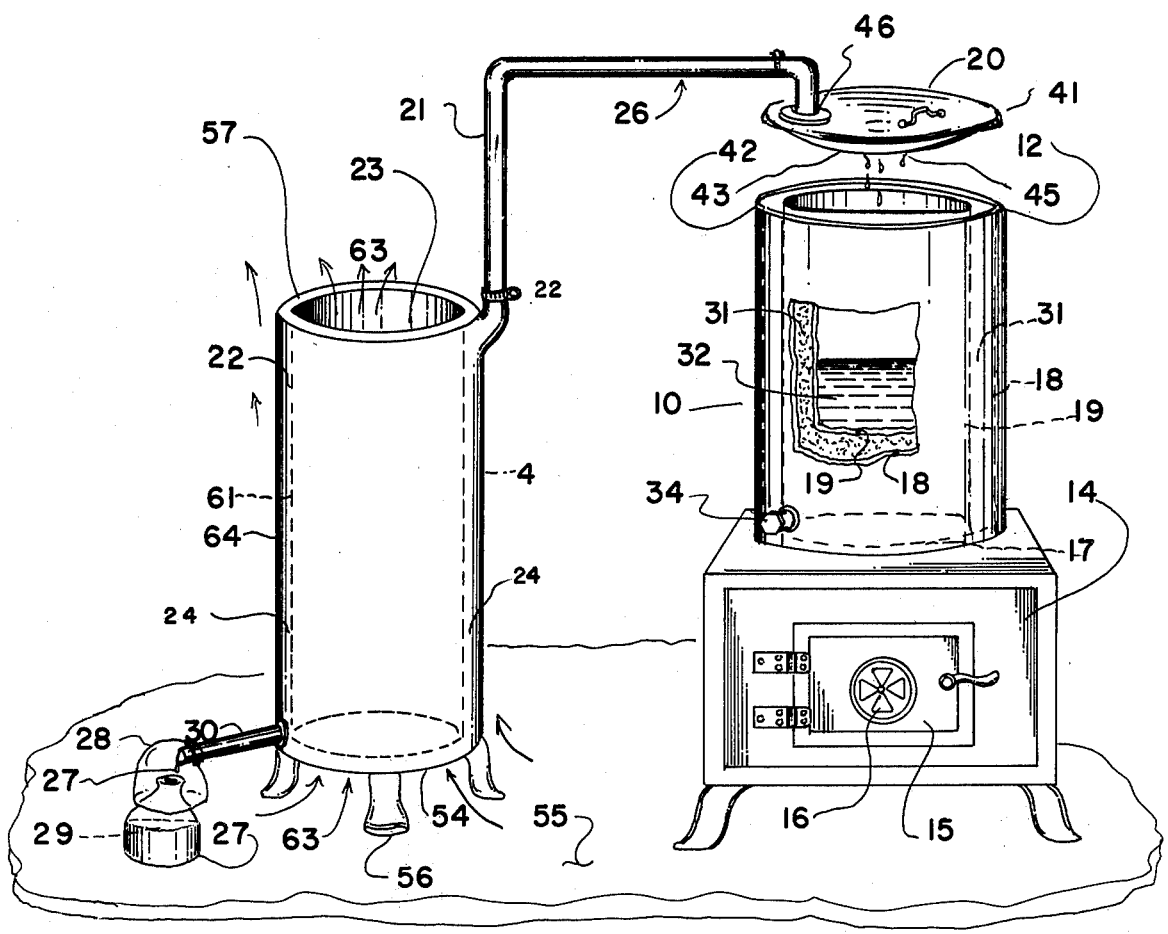
FIG. 1 is a perspective sectional view of the invention in use.

Turning now descriptively to the drawings, in which similar reference characters denote similar elements throughout the several views, FIG. 1 illustrates the condenser 20 mounted to condenser the vapors 21 led from a mash cooker kettle 10 by tube 26 into the inlet opening 22.

Kettle 10 is mounted on a fire box 14 fitted with a hinged fuel door 15 in which an adjustable vent opening unit 16 is fixed.

Kettle 10 is of general cylindrical construction and formed with a flat bottom metal base 17 joined to a cylindrical outer wall 18 and cylindrical inner wall 19 spaced apart by insulation material 31. Mash 32 in kettle 10 is a mixture of vegetable matter, brewer's yeast and water that has been allowed to ferment for a period of time ranging up to several days at ambient outdoor summer temperatures.

A drain plug 34 is threaded through the walls. The side and bottom walls of the fire box 14 are also of metal sheets spaced apart by insulation material.

Lid 11 is formed with a flange 41 that snugly fits about the top rim 42 of kettle 10, and is shaped, as seen from above as a concave disc so that the inside surface of lid 11 extends downwards from the flange 41 to the center 43 of the lid so that condensate drops 45 formed on the interior lid surface, will run to the center 43 of the lid and drop into the mash. This concave lid prevents condensed drops from leaking out at the peripheral edges of the lid.

An outlet pipe opening 46 is mounted through lid 11, to which tube 21 may be clamped. Tube 21 carries both the alcohol-water vapors boiled from the mash as well as any carbon dioxide gases produced during mash fermentation, and tube 21 is joined to inlet pipe 22 of the condenser 20.

Condenser 20 is formed of two concentric cylindrical copper or aluminum sheets that are spaced apart from each other and joined at their brazed upper and lower rims 54, 57 to form a sealed hollow cylindrical jacket enclosing a cylindrical shaped jacket interior 24 through which the distilled vapors are led from inlet tube 22. Legs 56 are fixed to lower rim 54 to space the rim 54 above the ground surface 55 on which the erected condenser is located. The cylinder open interior 23 is bounded by the inner condenser wall 61 and open at both top and bottom of the condenser so as to create a chimney through which an upward draft of ambient cooling air 63 flows, when inner wall 61 is heated by the distillate vapors. The chimney flow through the open interior chimney section 23 of the condenser, serves to also produce an upward flow of ambient cooling air about the exterior jacket wall 64.

The condensed alcohol-water liquid mixture, cooled by walls 61 and 64 flows down in jacket interior 24 to exit through tube 30. A container 29 placed to catch the condensate 27 may be sealed by a plastic cover 28 tied about both tube 30 and the container mouth.

A test model of this apparatus has been made using a condenser of approximately an eight inch diameter cylinder shape that is three feet high with a one-quarter inch spacing between the jacket walls of the condenser. The walls are of copper sheeting of approximately 0.025 inch gauge. The legs of the condenser are of a size to raise the bottom of the condenser approximately six inches above the ground level. A recent test demonstrated that boiling of a twelve percent alcohol-water mixture in the mash cooker resulted in the condenser distilling one pint of one-hundred proof alcohol in a period of five minutes.

For farm use, fermentation tanks may serve to store and ferment mash during the summertime, with distillation performed at cooler fall or winter temperatures, so as to conserve fuel.

Figures 2, 3, 4:
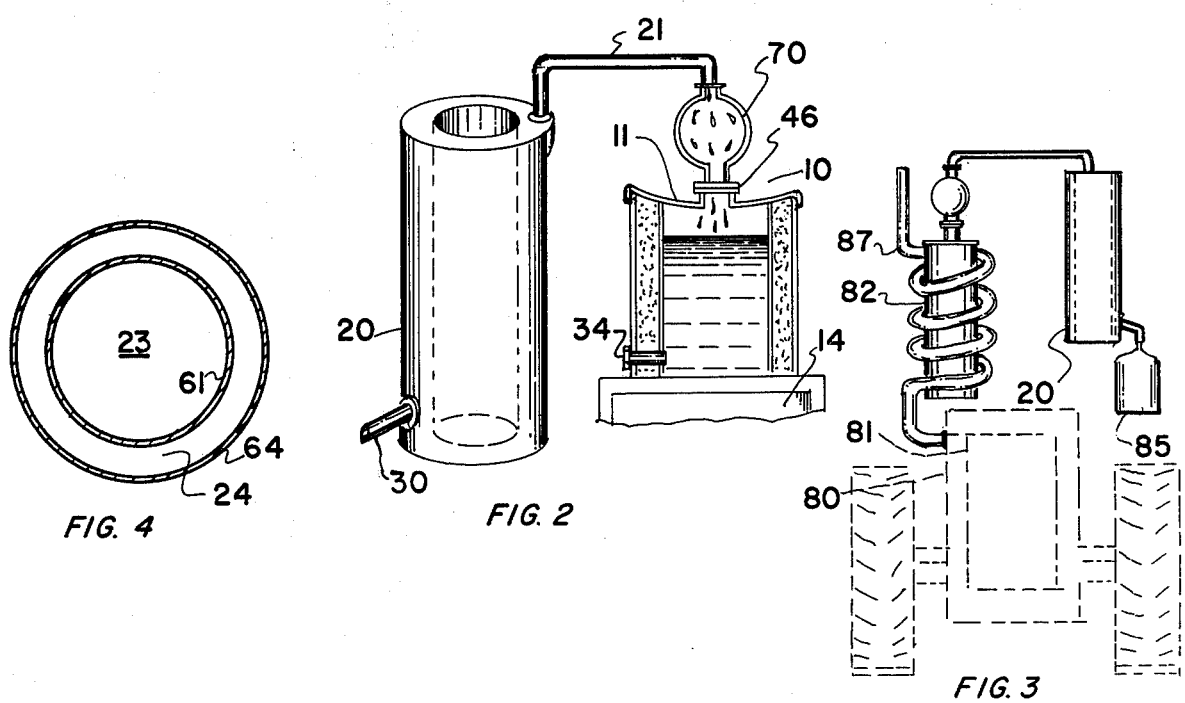
FIG. 2 is a sectional view of an alternative embodiment of the mash cooker unit.
FIG. 3 is an end view of the invention mounted on a tractor.
FIG. 4 is a cross-section view of the condenser taken along line 4—4 of FIG. 1.

As shown in FIG. 2, a metal hollow spherical separation chamber 70 may be mounted between lid outlet 46 and tube 21. This chamber serves to reflux the liquid mash droplets by returning the condensate that forms on the interior of the metal chamber walls, back into the mash kettle so that the higher boiling point water vapor will condense and will be washed back into the mash kettle, resulting in a higher proof of alcohol condensate in the condenser.

The system may be mounted on a stationary farm internal combustion engine that powers a pump or a grain mill, or as shown in FIG. 3, about the engine 81 of a tractor 80, with the mash cooker 82 heated by coils 83 carrying the engine exhaust vapor. The condenser 20 is mounted preferably on the opposed side of the tractor, from the mash cooker 82, with the condenser drain leading to a vented tank 85. Alternatively, the tank 85 may be connected to a carburetor inlet so as to feed the alcohol mixture to the engine carburetor. Preferably such an engine would have a twin carburetor for feeding both gasoline and the alcohol-water mixture into the engine cylinders.

The alcohol recovered after a single distillation is about fifty proof, if the mash is at or above its boiling point in the cooker. If the fifty proof alcohol is placed in the cleaned cooker and run through the condenser a second time at simmer stage or below boiling temperature, the proof of the alcohol is well over one-hundred. Fifty to one-hundred proof alcohol will not directly mix well with gasoline and should not be added to gasoline. Instead, the fifty to one-hundred proof alcohol should be injected in a vapor form into the air intake of the carburetor. The water in the fifty to one-hundred proof alcohol will cause the engine to produce more power and to stay cleaner and cooler. The water in the alcohol will not lime up any of the parts of engine, since it is distilled water and pure of salts.

Another way to obtain a high proof alcohol is to cook the mash below the boiling point of the mash mixture so that a higher percentage of alcohol vaporizes. We must remember the large water content in the mash when boiling will cause a large amount of water to condenser in the condenser with the alcohol, to lower the proof. A manufacturer of alcohol can use two or three of these condensers in line and by reheating the alcohol for each distilling operation, produce a very high grade alcohol well above one-hundred proof, that will mix with gasoline, directly in an automobile or tractor gas tank and carburetor.

A large cooper single wall sphere-shaped housing, about twenty inches in diameter, directly on top of the cooker, with a bottom intake from the cooker and a top outlet to the condenser should produce a high grade alcohol and was employed in the test model. This large sphere housing will stay very hot, while its inner surface will condense water that will flow back into the cooker, but most alcohol gas will not condense and will travel onto the condenser. This will leave more of the water in the cooker, and result in a higher proof condensate.

The fermentation of the mash is very slow especially if the mixture is cold (around 50° to 60°). By adding yeast or Brewer's yeast (one cup per twenty gallons of mash) I find that the fermentation of the mash is hastened and time can be saved. Also a small amount of sugar (five pounds to twenty gallons of mash) to feed the yeast germ and force it from its dormant stage will save time. The sugar is not wasted, as it will produce even more alcohol.

Figure 5:
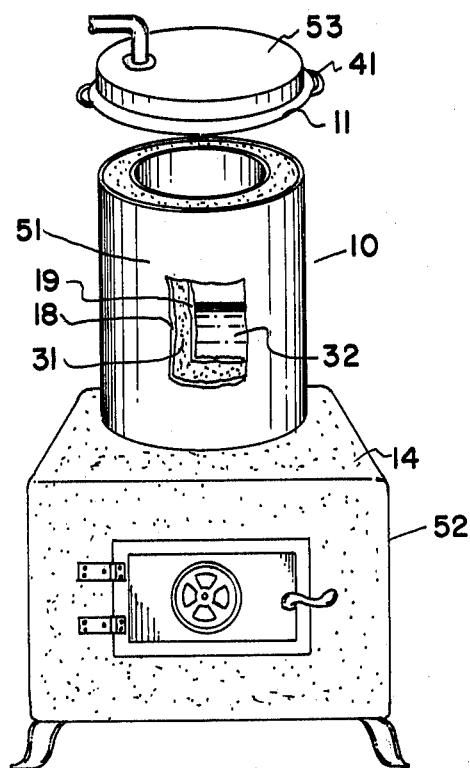
FIG. 5 is a perspective view of the mash cooker unit illustrating the external insulation.

FIG. 5 illustrates additional insulation 51, 52 applied externally to the kettle 10 and fire box 14. Preferably such insulation should be three to four inches thick, with a three inch disc 53 of insulation applied externally to lid 11.

Figure 6:
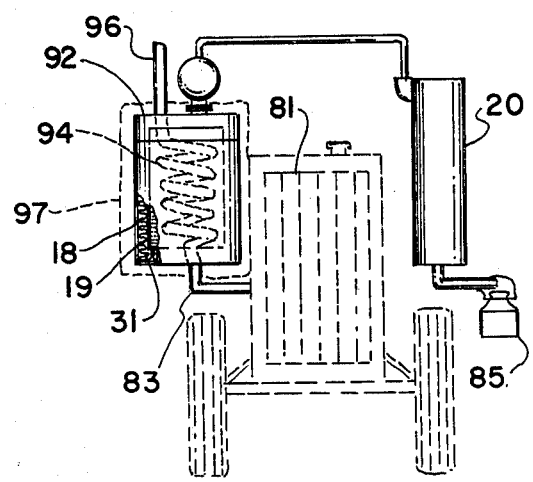
FIG. 6 is a front view of an alternative embodiment of the tractor-mounted unit.

FIG. 6 illustrates an alternative embodiment of the mash cooker 92 which is heated by an internal coil 94 leading from the exhaust manifold 83 of engine 81, with coil 94 externally vented by vertical chimney pipe 96. An external jacket 97 of insulation may enclose the bottom and sides of cooker 92, with cooker 92 also fitted with an internal wall 19 spaced from an outer wall 18 by insulation 31 as shown in FIG. 1.

Figure 7:
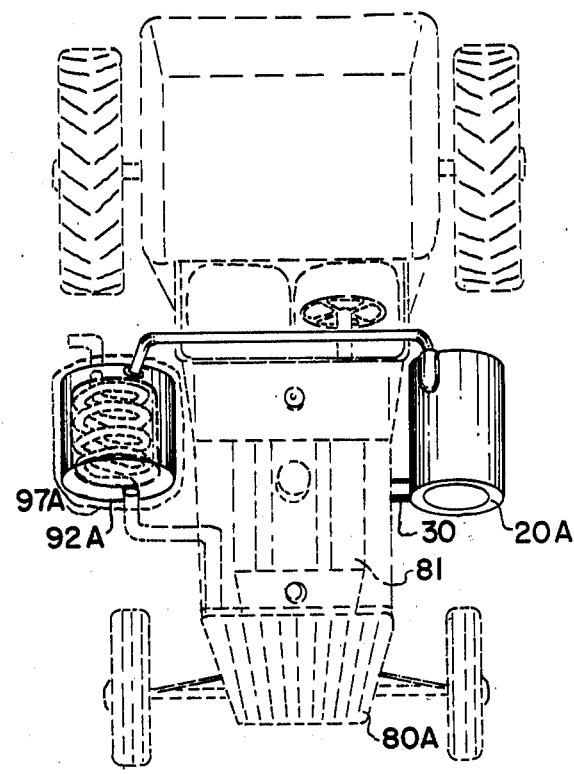
FIG. 7 is a top perspective view of a further alternative embodiment of the tractor-mounted unit.

As shown in FIG. 7, the mash cooker 92A on the tractor may be mounted to extend along a horizontal axis with a detachable cover mounted in a top wall of the cooker. The outlet 30 of condenser 20 may be led to a vented tank in the engine compartment of tractor 80A.

Figure 8:
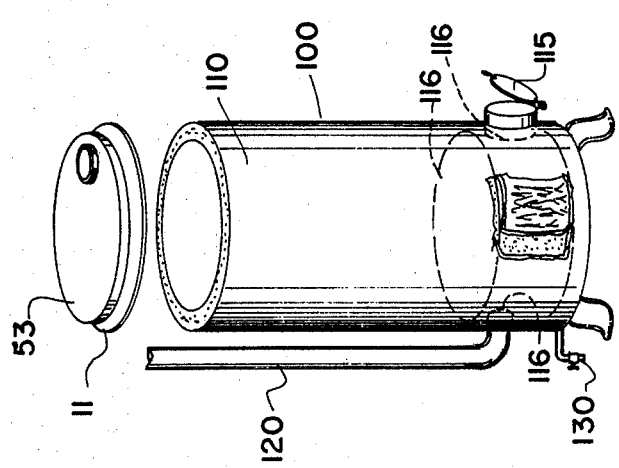
FIG. 8 is a perspective view of an alternative embodiment of the mash cooker and fire box.

FIG. 8 illustrates an insulated mash cooker and fire box unit 100 in which the fire box 114 is surrounded on the sides and top by the interior chamber 116 of the kettle section 110. A flue 120 is externally mounted to the unit to join the interior of the fire box 114. The fire box is fed from door 115. The fire box may be of circular or rectangular cross-section in plan view, and a clean out drain pipe 130 with external valve leads from the interior kettle chamber 116.

Figure 9:
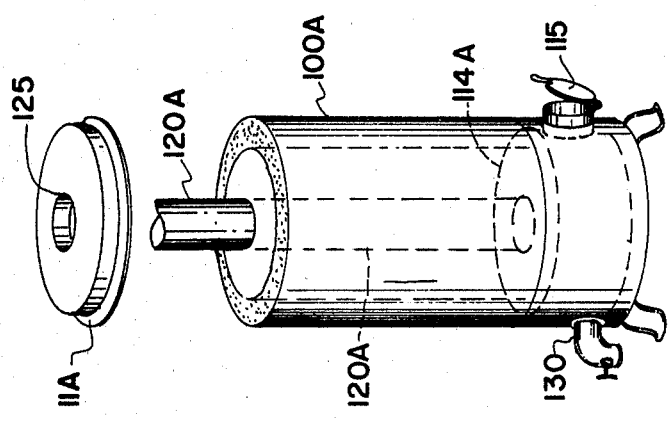
FIG. 9 is a perspective exploded view of a further embodiment of the mash cooker and fire box.

FIG. 9 illustrates a further modification of the kettle and fire box unit 100A in which the interior of fire box 114A is joined to a vertical internal flue pipe 120A which extends through the interior of the kettle section 20 and a hole 125 in lid 11A so that flue pipe also serves to heat the contents of the kettle section.

Figure 10:
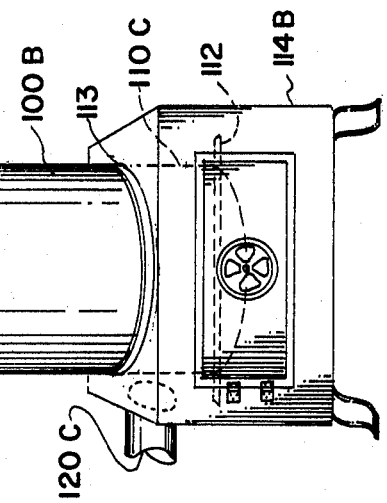
FIG. 10 is a perspective view of a further alternative embodiment of the mash cooker unit.

FIG. 10 illustrates a further alternative embodiment of a mash cooker unit 100B, in which the kettle 110B is of cylindrical cross-section, with the lower section 110C of said kettle extending into the interior chamber of an insulated fire box 114B. The upper section of the kettle that extends externally of the fire box is insulated, as is the fire box as shown in FIG. 5. A steel cross member 112, mounted to the inside of the fire box chamber wall, supports the kettle bottom section, with a steel ring 113 welded to the top of the fire box also welded to the external wall of the kettle to serve as a support. A flue 120C extends externally from a side of the fire box.

As shown in FIG. 11, an alternative mash cooler unit 200 may be employed in which the bulk of the lower portion 212 a cylindrical kettle 210 is mounted inside and spaced from the wall 221 of the upper portion of a cylindrical housing 220 which encloses the fire chamber 230. Housing 220 is mounted on support base 224. Housing 220 is enclosed in spun glass insulation 226. An exhaust flue 228 is joined to the upper portion of housing 220. A perforated horizontal deflector plate 234 is mounted between the outer kettle wall 214 of kettle 212 and the wall 221 of housing 220 so as to diffuse the flow of heated fire gas from the fire chamber evenly about the kettle wall 214 prior to the gases flowing into the exhaust duct opening 229 of flue 228. Spaced perforation holes 231 in plate 234 may be of different sizes and spacing so as to create an even flow of heat upwards about the enclosed portion of the kettle. Kettle 210 is mounted to support ring 222 in the roof section of the housing 220 and is fitted with a lid 20.

FIG. 12 illustrates an alternative form of a kettle 250 and a heating system for a vehicle or trailer mounted unit, in which a thermostat device 256 is employed to regulate the flow of engine exhaust gas through coils 258 inside of kettle 250 which heats a mash mixture in the kettle so as to limit the maximum temperature of the mixture in the kettle to below 210° Fahrenheit, so as to maximize the alcohol content of the vapors exiting the kettle through outlet 46 of lid 20. An exhaust pipe 260 extending from the exhaust manifold of the engine 81 joins tube 262 leading to exhaust coil 258 inside of the kettle, with coil terminating in a vented section 259 that extends upward inside of kettle 250 to join a first external exhaust pipe 264. Engine exhaust pipe 260 is also joined to a second exhaust outlet 270 that extends to a conventional muffler 274 and a vent pipe 276. Valves 278 and 268 are respectively mounted in pipes 270 and 262 respectively and joined by linkage 280 to thermostat 256 which is mounted on a plate 257 and regulated by adjustment screw 254. Linkage 280 tends to open valve 278 and to close valve 268 as the thermostat 256 responds to higher temperatures, with the reverse effect as the thermostat responds to cooler temperatures. As shown in FIG. 12, the valves are at the setting of the maximum temperature in the kettle, as set by adjustment screw 254 for the kettle temperatures which provide for the engine exhaust gases completely by-passing the kettle coil 258. At lower temperatures in the kettle, the linkage would simultaneously partly or fully close valve 278 and open valve 268 to provide heating of coil 258 by the exhaust gases.

FIGS. 17 and 18 illustrate alternative embodiments of the condenser 20, with the shape of condenser 20A being in the cross-section of a hollow rectangle and that of condenser 20B being in the shape of a triangle. Obviously the cross-section of various embodiments of condenser 20 may be of other hollow geometric figures of flat or curve sides, with such condensers formed of spaced inner and outer walls 61A and 64A respectively as in FIGS. 17 and 18. As shown in FIG. 16, the spaced inner and outer walls 61C and 64C may each be of a conical shape so that the condenser 320D is in the form of a funnel.

Alternative condensers 320A, 320B, or 320C may be formed of two spaced sheets joined about their outer edges to bound a interior chamber connected to inlet 22 and outlet 30. These sheets may be of the shape of a circular plate 90A, or a rectangular plate 90B or a rhomboid plate 90C, as shown in FIGS. 17-21 or may be of other shapes such as those of a pentagon, or hexagon etc.

Alternative condenser 320E of FIG. 15 is formed of two spaced corrugated sheets 90E that are joined at their edges.

The condensers 320A, 320B, 320C, 320D and 320E are of particular preferred use where the device is mounted on a moving vehicle so that the ambient air may flow vertically about the condenser walls, when at rest, due to thermal action, or the ambient air may flow along a horizontal vector when the vehicle is in motion.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A process for producing alcohol, comprising, providing an apparatus, mounted on a vehicle powered by an internal combustion engine, for distillation of alcohol, comprising a vessel for containing mash, means for heating the mash in said vessel to form an alcohol-containing vapor, a condenser coupled to said vessel for condensing said vapor, said condenser being in the form of a hollow double metal walled shaped body formed of an interior metal wall and an exterior metal wall spaced from said interior interior wall and concentric therewith so as to enclose an interior chamber, with both said walls joined together along opposed ends of said walls, and with said condenser shaped to that ambient air may freely flow about the exterior surfaces of both metal walls so as to cool vapors in the chamber to cause said vapors to condense, together with inlet and outlet means connected to said chamber,
   in which an exhaust system of said engine serves as the means for heating the vessel containing the mash, and in which the condenser chamber inlet means is connected to an outlet of the mash-containing vessel and in which the condenser chamber outlet means is coupled to the fuel supply of said engine, and recovering an alcoholic distillate from said apparatus.

* * * * *